United States Patent [19]

Henningsson

[11] 4,312,403
[45] Jan. 26, 1982

[54] HOT WATER RADIATOR

[76] Inventor: Thom Henningsson, Nyodlingsvägen 9, S-191 40 Sollentuna, Sweden

[21] Appl. No.: 120,567
[22] PCT Filed: Nov. 15, 1978
[86] PCT No.: PCT/SE78/00078
§ 371 Date: Jul. 17, 1979
§ 102(e) Date: Jul. 16, 1979
[87] PCT Pub. No.: WO79/00301
PCT Pub. Date: May 31, 1979

[30] Foreign Application Priority Data

Nov. 17, 1977 [SE] Sweden ................. 7712994

[51] Int. Cl.³ ............................................. F28F 3/12
[52] U.S. Cl. ..................................................... 165/170
[58] Field of Search ........... 165/153, 152, 166, 167, 165/170, 173, 175, 49

[56] References Cited

U.S. PATENT DOCUMENTS

| 1,142,179 | 6/1915 | Kiendl | 165/153 |
| 1,726,458 | 8/1929 | Tellander | 165/170 |
| 2,472,937 | 6/1949 | Brinkoeter | 165/170 |
| 4,209,064 | 6/1980 | Cacalloro et al. | 165/170 X |
| 4,210,127 | 7/1980 | Kleine et al. | 165/170 X |

FOREIGN PATENT DOCUMENTS

| 889731 | 1/1972 | Canada | 165/49 |
| 415245 | 2/1924 | Fed. Rep. of Germany | 165/170 |
| 434787 | 3/1927 | Fed. Rep. of Germany | 165/152 |
| 2449145 | 4/1976 | Fed. Rep. of Germany | 165/152 |
| 396576 | 4/1909 | France | 165/152 |
| 2207266 | 6/1974 | France | 165/166 |
| 80883 | 2/1956 | Netherlands | 165/170 |
| 338785 | 10/1968 | Sweden | 165/166 |
| 384567 | 2/1975 | Sweden | 165/166 |
| 577156 | 6/1976 | Switzerland | 165/170 |
| 22936 | of 1903 | United Kingdom | 165/152 |
| 649870 | 2/1951 | United Kingdom | 165/170 |
| 845178 | 8/1960 | United Kingdom | 165/170 |
| 560108 | 8/1977 | U.S.S.R. | 165/170 |

Primary Examiner—Sheldon J. Kichter
Attorney, Agent, or Firm—Lewis H. Eslinger

[57] ABSTRACT

A hot water radiator intended mainly for heating domestic and office spaces. The radiator consists of two main components (10,20) with a first main duct (1) for introducing hot water and a second main duct (2) for removing cooled water as well as of a number of radiator ducts. The radiator ducts are formed and bounded by plane surfaces (11,21) and indentations (12-19,22,23) in the main components. These indentations are short both by comparison with the main ducts and with the distance between the main ducts. The main ducts with plane surfaces, indentations and main ducts can be produced by pressing or rolling plane metal sheets. The main components can be joined with one another by seam-welding and sportwelding. The hot water radiator is intended for connection (13,14) to a central heating system which supplies the heated water and removes the cooled water.

4 Claims, 5 Drawing Figures

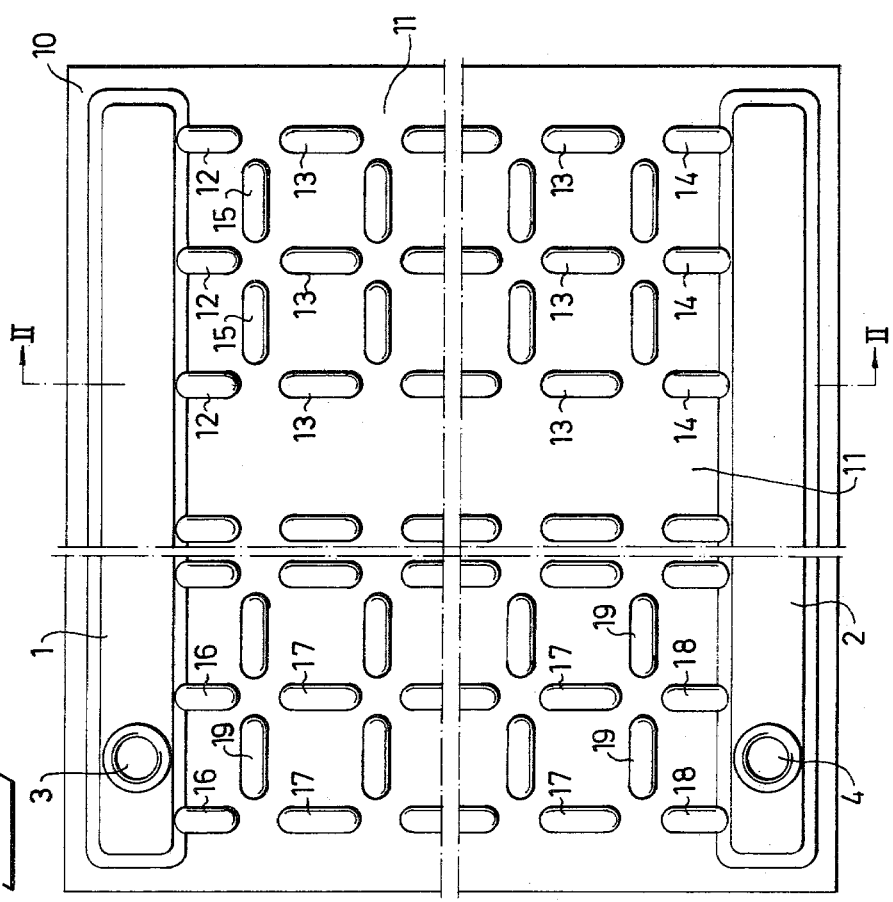

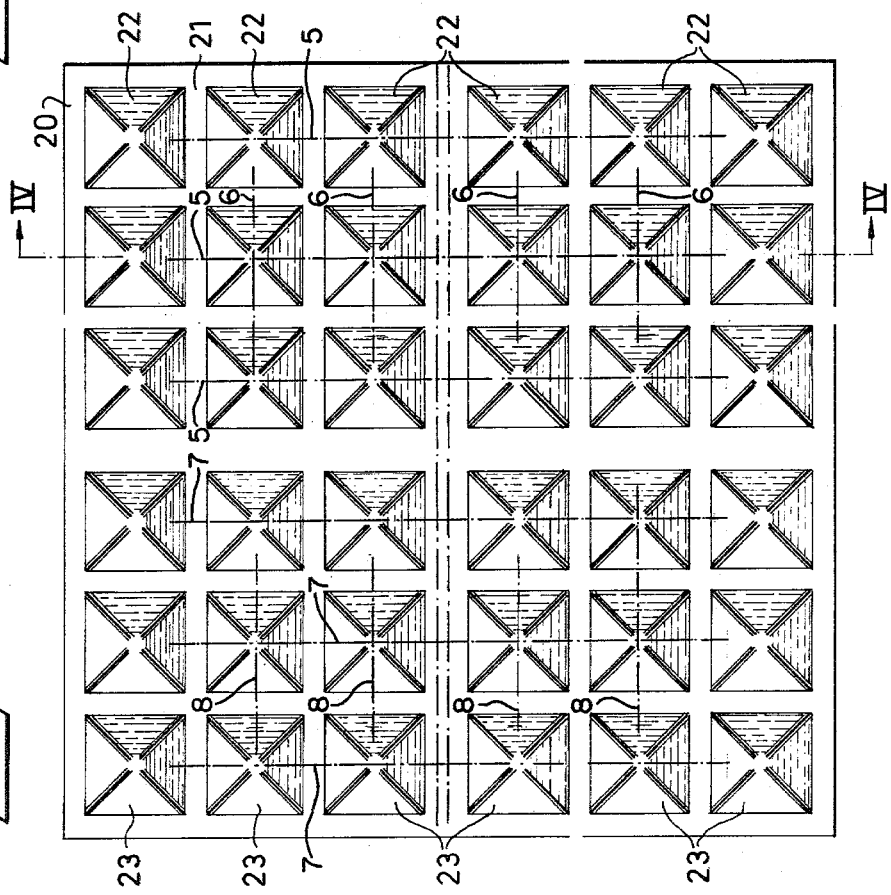

HOT WATER RADIATOR

The following invention relates to a hot water radiator.

A hot water radiator mounted with a view to heating the air in a room generally encroaches upon the space in the room. A thin hot water radiator is therefore frequently preferable to a thicker radiator with corresponding performance characteristics. Especially in domestic spaces it is often also desirable for the radiator to have an aesthetically agreeable appearance.

A hot water radiator with a low volume of water per m² radiator surface is in some respects preferable to one with a higher volume of water per m² radiator surface but in other respects of equal performance characteristics. In connection with temperature control, for instance, the liquid in the radiator entails a delay factor in the control process.

Even and efficient distribution of the heat over the radiator surface and a high capacity of transmitting heat energy from the water to the surroundings are a further common requirement as regards hot water radiators.

Many known and proposed hot water radiators are composed of panels and hot water ducts located between or against the panels. The present invention is based on similar ideas but by making use of a specially designed system of indentations in two plane surfaces, a new type of hot water radiator has been achieved which satisfies at least the majority of the above requirements in a particularly successful manner. What specially characterises hot water radiators in accordance with the invention will be seen most clearly from the following description of embodiments and the patent claims.

FIG. 1 shows selected parts of a first main component of a hot water radiator as seen from the outside of the radiator.

FIG. 2 presents a section through the first main component of the hot water radiator.

FIG. 3 shows selected parts of a second main component of a hot water radiator as seen from the outside of the radiator.

FIG. 4 presents a section of the second main component of the hot water radiator.

FIG. 5 shows a section of a radiator duct between a first main duct and a second main duct of the hot water radiator.

The reason why only selected parts of the radiator are shown in FIGS. 1-5 and not the entire radiator is due to the fact that certain details would appear so small that in the scale required for showing the entire radiator the drawings would become unclear.

A hot water radiator in accordance with the invention comprises two main components, one of which may be designed as shown in FIGS. 1 and 2. The one main component, 10, shown in FIGS. 1 and 2 possesses a substantially plane surface 11 and a number of indentations, 1-2 and 12-19, extending in the same direction from a plane through surface 11. All indentations are elongated and two of them, 1 and 2, are considerably wider and longer than the others. The indentations 12-19 are separated from one another by the continuous plane surface 11. Their shape is such that viewed from the outside of the radiator they may be said to correspond to ridges rounded in the longitudinal direction and in the transverse direction. Certain of the indentations thus shaped as ridges, 12, 14, 16 and 18, are connected direct with the considerably larger indentations. Some of the indentations, 15 and 19, extend in the same direction as the considerably larger indentations. The remaining indentations, 12, 13, 14, 16, 17 and 18, extend at right angles to this direction. All indentations 12-19 are, as can be seen from the drawing, short by comparison with the indentations 1-2 and by comparison with the distance between the indentations 1 and 2. The indentations 12-19 shown in the drawing are all shorter than one fifth of the distance between the indentations 1 and 2. The main component 10 with at least the majority of the indentations can be produced by pressing or rolling sheet with a thickness of 1-1.5 mm. FIG. 1 finally shows devices 3 and 4 for connecting water lines with or without valves.

FIGS. 3 and 4 show a second main component 20 with a substantially plane surface 21 and a number of indentations, 22 and 23. The indentations extend in the same direction from a plane through the surface 21. The indentations have a shape which viewed from the outside of the radiator may be said to correspond to somewhat rounded pyramids. They are separated from one another by the continuous surface 21, which extends between adjacent indentations. The positions of the indentations in relation to one another are such that they form groups, the distance between adjacent indentations 22 in one group being substantially constant and equally large as the distance between adjacent indentations 23 in the other group. The distance between two adjacent indentations in different groups, an indentation 22 and an indentation 23, is on the other hand considerably larger. All indentations 22, 23 are short by comparison with the indentations 1, 2 and by comparison with the distance between the indentations 1 and 2.

With the hot water radiator shown in FIG. 5, the one main component 10 with its plane surface 11 is turned towards and located against the plane surface 21 of the second main component 20. The positions and size of the indentations 22 are so adjusted to the positions and size of the indentations 12, 13, 14 and 15, respectively, can communicate with one another through the space between the plane surface 11 and the indentations 22. In this way, continuous radiator ducts 5 are formed, which are bounded by the plane surfaces 11 and 21 and, in turn, an indentation 12, an indentation 22, an indentation 13, and indentation 22, an indentation 22 and an indentation 14. Since indentations 12 and 14 communicate with the indentations 1 and 2, respectively, this means that the radiator ducts 5 join the space between the indentation 1 and the second main component 20 to the space between the indentation 2 and the second main component 20.

The radiator ducts 5 extend transversely in respect to the longitudinal direction of the indentations 1 and 2. The spaces between the plane surfaces 11 and 21 and the indentations 15 form, in an analogue manner, radiator ducts 6 extending in the longitudinal direction of indentations 1 and 2 and joining the radiator ducts 5 with one another.

The positions and size of the indentations 23 match the position and size of the indentations 16, 17, 18 and 19 in the same way as the positions and size of the indentations 22 match the positions and size of the indentations 12, 13, 14 and 15. The spaces between the plane surfaces 11 and 21 and the indentations 16, 17, 18 and 23 accordingly constitute continuous radiator ducts 7 connecting the space between the indentation 1 and the second main component with the space between the indentation 2 and the second main component. Furthermore, the spaces between the indentations 19 and 23 and the plane surfaces 11 and 21 form continuous radiator ducts 8 extending in the longitudinal direction of the indentations 1 and 2 and joining the radiator ducts 7 with one another.

Since there are no longitudinal radiator ducts joining the radiator duct 5 closest to the radiator duct 7 with the nearest radiator duct 7, the radiator ducts may be said to form groups, with the radiator ducts (e.g. 5) of the same group directly communicating with one another through radiator ducts (e.g. 6) in the group whereas radiator ducts (5 or 7, respectively) in different groups communicate with one another only through the spaces between the indentations 1 and 2 and the second main component. If, for instance, hot water is introduced into the radiator through the device 3 and drained from the radiator through the device 4, the latter space may be characterised as a first main duct for the introduction of water or as a second main duct for the removal of water.

The main components 10 and 20 can be attached to one another and secured in relation to one another by, for instance, spot welding at a suitable number of points and at such positions where the plane surface 11 abuts the plane surface 21. If the main components have the same external dimensions, which is preferable, the radiator can be sealed by seam welding around the periphery of the main components.

Comparative measurements carried out, inter alia, at the thermal laboratory of AB Atomenergi at Studsvik show that a radiator in accordance with the invention can be so designed as to have a relatively low volume of water per $m^2$ radiator surface. The comparative measurements also show that a radiator in accordance with the invention can, at the same time, be designed with a low flow resistance, which can be an advantage in certain cases.

It may be assumed that the system of longitudinal and transverse radiator ducts communicating with one another contributes to bringing about even heat distribution over the surface of the radiator. The repeated bends in the radiator ducts and the variations in their cross-section may be assumed to contribute to efficient heat exchange between the water and the main components.

Hot water radiators in accordance with the invention can obviously be made relatively thin. It is likely that radiators of different sizes could be produced relatively cheaply, inter alia, in view of the said possibility of rolling.

It stands to reason that hot water radiators in accordance with the invention need not be designed exactly in the manner described above. For instance, the indentations 12-19 need not have exactly the shape shown in the figure nor need they necessarily be arranged in such a pattern as to form groups of radiator ducts. The indentations 22 and 23 need not necessarily be shaped as somewhat rounded square pyramids. They may, for instance, be more or less cup-shaped instead. Further variations are feasible within the framework of the patent claims.

In order to achieve hot water radiators with a good heating capacity it is, however, preferable for the indentations to be short and so shaped and orientated in relation to one another that the radiator ducts have a winding shape, if at all possible with repeated changes of cross-section. The radiator duct in FIG. 5 has such a winding shape inasmuch as it is partly entirely on one side of a plane between the plane surfaces of the main components and partly entirely on the other side of this plane.

I claim:

1. A radiator comprising two main parts each having a flat surface provided with indentations, said parts being placed one over the other with the indentations extending outwardly from the interface of the parts, a first relatively long main channel formed by certain of the indentations in the two parts, extending in a first direction and for supplying liquid to the radiator, a second relatively long main channel formed by certain of the indentations in the two parts, extending in the first direction and for removing said liquid from the radiator, first channels connecting the main channels with each other, extending in a second direction substantially perpendicular to the first direction and formed by relatively short indentations in the two parts and by portions of the flat surface separating the indentations from each other, and second channels connecting more than two of the first channels to each other, extending in the first direction and formed by relatively short indentations in the two parts and by portions of the flat surface separating the indentations from each other, wherein each of said relatively short indentations of at least one of the main parts are of an elongated configuration and has an end located in the vicinity of the ends of at least two other short indentations and that said ends of the relatively short indentations in the vicinity of one another communicate with each other via an indentation in the other part.

2. A radiator according to claim 1, wherein the indentations in at least one part are arranged in a pattern so that groups of radiator channels are formed, the channels of each group communicating directly with each other via said second channels whereas channels of different groups communicate with each other only via the main channels.

3. A radiator comprising two main parts each having a flat surface provided with indentations, said parts being placed one over the other with the indentations extending outwardly from the interface of the parts, a first relatively long main channel formed by certain of the indentations in the two parts, extending in a first direction and for supplying liquid to the radiator, a second relatively long main channel formed by certain of the indentations in the two parts, extending in the first direction and for removing said liquid from the radiator, first channels connecting the main channels with each other, extending in a second direction substantially perpendicular to the first direction and formed by relatively short indentations in the two parts and by portions of the flat surface separating the indentations from each other, and second channels connecting the first channels to each other, extending in the first direction and formed by relatively short indentations in the two parts and by portions of the flat surface separating the indentations from each other, wherein the indentations in one main part are shaped as rounded-off pyramids and the indentations in the other main part are shaped as rounded-off ridges in both longitudinal and transverse directions thereof.

4. A radiator comprising:
   a first main part having a flat surface provided with indentations; and
   a second main part having a flat surface with indentations of a different shape than the indentations of the first main part, said flat surfaces being assembled together in an abutting relationship with the indentations of the two parts extending outwardly from the interface of the parts, wherein a first relatively long main channel for supplying a heated liquid to the radiator is formed by certain of the indentations in the two parts and extends in a first direction, a second relatively long main channel for removing said liquid from the radiator is formed by certain of the indentations in the two parts and extends in the first direction, first channels connecting the main channels with each other and extending in a second direction substantially perpendicular to the first direction are formed by relatively short indentations in the two parts and by portions of the flat surfaces separating the indentations from each other, and second channels connecting more than two of the first channels to each other and extending in the first direction are formed by relatively short indentations in the two parts and by portions of the flat surfaces separating the indentations from each other, with the first and second channels having a winding shape with repeated changes in cross-sectional area thereof so as to provide efficient heat-exchanging activity between said liquid and said first and second main parts, and wherein each of said relatively short indentations of at least one of the main parts are of an elongated configuration and has an end located in the vicinity of the ends of at least two other short indentations and that said ends of the relatively short indentations in the vicinity of one another communicate with each other via an indentation in the other main part.

* * * * *